(12) United States Patent
Yelvington et al.

(10) Patent No.: US 10,646,824 B2
(45) Date of Patent: May 12, 2020

(54) CATALYTIC COOKSTOVE WITH PASSIVE CONTROL OF DRAFT AND METHOD OF USE

(71) Applicant: Mainstream Engineering Corporation, Rockledge, FL (US)

(72) Inventors: Paul E. Yelvington, Rockledge, FL (US); Alex Paulsen, Rockledge, FL (US); Andrew Carpenter, Rockledge, FL (US); Tyler Kunsa, Melbourne, FL (US); Ted Amundsen, Satellite Beach, FL (US); Nicholas Schwartz, Rockledge, FL (US)

(73) Assignee: Mainsteam Engineering Corporation, Rockledge, FL (US)

( * ) Notice: Subject to any disclaimer, the term of this patent is extended or adjusted under 35 U.S.C. 154(b) by 175 days.

(21) Appl. No.: 16/005,897

(22) Filed: Jun. 12, 2018

(65) Prior Publication Data
US 2019/0374907 A1  Dec. 12, 2019

(51) Int. Cl.
*B01D 53/86* (2006.01)
*B01J 21/06* (2006.01)
(Continued)

(52) U.S. Cl.
CPC .......... *B01D 53/864* (2013.01); *B01J 21/063* (2013.01); *B01J 23/04* (2013.01); *B01J 35/04* (2013.01); *F24B 1/08* (2013.01); *F24B 1/1895* (2013.01); *B01D 2201/62* (2013.01); *B01D 2255/2022* (2013.01); *B01D 2255/20707* (2013.01); *B01D 2257/502* (2013.01)

(58) Field of Classification Search
CPC . F24B 1/08; F24B 1/1895; B01J 35/04; B01J 21/063; B01J 23/04; B01D 53/864; B01D 2257/502; B01D 2255/2022; B01D 2201/62; B01D 2255/20707
See application file for complete search history.

(56) References Cited

U.S. PATENT DOCUMENTS 3,568,590 A  3/1971  Grice
4,164,930 A  8/1979  Johnston
(Continued)

FOREIGN PATENT DOCUMENTS

KR  1020080055629  6/2008
KR  1020170060433  6/2017
(Continued)

OTHER PUBLICATIONS

S. Bensaid, N. Russo, D. Fino—After-Treatment of Household Wood-Fired Stove Emissions: From Catalyst Formulation to Full-Scale System—Oct. 2011.
(Continued)

*Primary Examiner* — Alfred Basichas
(74) *Attorney, Agent, or Firm* — Michael W. O'Neill, Esq.

(57) ABSTRACT

A catalytic cookstove, for use in cooking, heating, and lighting, is disclosed for reducing particulate matter and carbon monoxide emissions. A non-platinum group metal catalyst promotes oxidation of particulate matter and carbon monoxide to produce carbon dioxide. Additionally, a passive damper automatically adjusts the fuel-to-air ratio based upon the size of fuel fed to the stove to ensure catalyst light off.

13 Claims, 3 Drawing Sheets

(51) Int. Cl.
  *B01J 23/04* (2006.01)
  *B01J 35/04* (2006.01)
  *F24B 1/189* (2006.01)
  *F24B 1/08* (2006.01)

(56) References Cited

U.S. PATENT DOCUMENTS

| | | | | |
|---|---|---|---|---|
| 4,330,503 | A | * | 5/1982 | Allaire ............... F23B 5/00 |
| | | | | 110/203 |
| 4,588,373 | A | | 5/1986 | Tonon et al. |
| 4,827,902 | A | * | 5/1989 | Rinker ............... F24B 1/192 |
| | | | | 126/190 |
| 4,846,400 | A | | 7/1989 | Crouse |
| 4,909,235 | A | | 3/1990 | Boetcker |
| 5,195,500 | A | | 3/1993 | Lerner |
| 5,528,982 | A | | 6/1996 | Chuang |
| 2009/0050129 | A1 | | 2/2009 | Robinson, Jr. |
| 2010/0024796 | A1 | | 2/2010 | Lee |
| 2018/0119959 | A1 | * | 5/2018 | Purinton ............ F24B 1/006 |

FOREIGN PATENT DOCUMENTS

| | | |
|---|---|---|
| WO | WO2013046150 | 4/2013 |
| WO | 2015-153224 A1 | 10/2015 |

OTHER PUBLICATIONS

P. Burnet, N. Edmisten, P. Tiegs, J. Houck, R. Yoder—Particulate, Carbon Monoxide, and Acid Emission Factors for Residential Wood Burning Stoves—vol. 36, No. 9—Sep. 1986.

P. M. Fine, G.R. Cass, and B. R.T. Simoneit—Chemical Characterization of Fine Particle Emissions from the Wood Stove Combustion of Prevalent United States Tree Species—vol. 21, No. 6—2004.

P. Hedge, A. Fernandes, A. Patil, A. Johny, N. Fernandes—Energy Efficient Wood Stove—vol. 5, Issue 4—2016.

R. C. McCrillis, R. Watts, and S. H. Warren—Effects of Operating Variables on PAH Emissions and Mutagenicity of Emissions from Woodstoves—vol. 42, No. 5—May 1992.

M. Wohler, G. Reichert, Jens-Michael Kirchhof, M. Schwabl, C. Schmidl, W. Haslinger—Operation Characteristics of a Bulk Catalyst in a Test Stand Under Similar Conditions to a Firewood Stove—Feb. 2013.

M. Goon, B. Grabowski, N. Knight, M. Jenkins and J. Mathews—Renewable Energy Burning Cookstove and Surface Environment—Jun. 4, 2012.

Jason Prapas—Toward the Understanding and Optimization of Chimneys for Buoyantly Driven Biomass Stoves—Fall 2013.

T. Jayarathne, C. Stockwell, P. Bhave, P. Praveen, C. Rathnayake, R. Islam, A.Panday, S. Adhikkari, R. Maharjan, J.D. Goetz, P. DeCarlo, E. Seikawa, R. Yokelson and E. Stone—Nepal Ambient Monitoring and Source Testing Experiment (NAMaSTE): Emissions of Particulate Matter from Wood and Dung Cooking Fires, Garbage and Crop Residue Burning, Brick Kilns and other Sources.—Jun. 9, 2017.

Patent Cooperation Treaty (PCT) International Search Report for application No. PCT/US2018/046514, dated Feb. 22, 2019.

Patent Cooperation Treaty (PCT) Written Opinion of the International Searching Authority (Korea) for application No. PCT/US2018/046514, dated Feb. 22, 2019.

International Preliminary Report on Patentability for PCT/US2018/013466.

* cited by examiner

CATALYTIC COOKSTOVE WITH PASSIVE CONTROL OF DRAFT AND METHOD OF USE

STATEMENT REGARDING FEDERALLY SPONSORED RESEARCH OR DEVELOPMENT

This invention was made with Government support under grant 2R44ES022880-02 awarded by the National Institutes of Health, National Institute of Environmental Health Sciences. The Government has certain rights in the invention.

BACKGROUND AND SUMMARY OF THE INVENTION

The present invention is directed to an article of manufacture and method of use to reduce particulate matter and carbon monoxide emissions from a cooking fire. Particularly, the present invention is concerned with a solid-fuel-fired cookstove, used for cooking, heating, and lighting, that incorporates a non-platinum group metal (PGM), oxidation catalyst and a passive damper. Here "PGM" refers to ruthenium, rhodium, palladium, osmium, iridium, or platinum. The oxidation catalyst lowers the oxidation temperature to promote complete combustion to carbon dioxide, while the passive damper controls the air-to-fuel ratio to improve thermal efficiency, encourage catalyst light off, and promote complete combustion to carbon dioxide.

A significant percentage of the world's population, estimated at 2.5 billion people, regularly cooks with biomass fuels such as wood or charcoal. In many countries, the demand for firewood outpaces forest regrowth, leading to deforestation. Additionally, emissions from biomass cookstoves contribute to global climate change, increase indoor air pollution, and are harmful to human health. Exposure to high indoor air pollutant levels from cooking with biomass fuels is responsible for an estimated 1.6 million deaths annually and about 3% of the global burden of disease. As such, it is important to improve fuel efficiency in order to reduce both deforestation and harmful combustion-derived emissions.

The most basic cookstove is the so-called three-stone fire that consists of a cooking vessel balanced upon three stones of similar height, with the fire located at the center of the stones. Numerous stoves exist that improve fuel efficiency and combustion efficiency compared to the three-stone fire. Stove designs vary widely in size, shape, design, and material. At minimum, most stoves incorporate a combustion chamber, an internal exhaust conduit, and a pot support or drip pan that the cooking vessel rests upon. Optionally, a chimney can be attached to some stoves to improve draft and direct stove exhaust outside of the home. Here "chimney" is defined as the duct that carries exhaust out of the home and is located downstream of the location where heat is extracted for the purpose of cooking and "exhaust" is defined as the mixture of unreacted air, pollutants, and combustion products that are produced during the combustion of solid fuel.

Prior art stoves include small stoves with a single burner and large stoves with multiple burners. Large stoves contain the fire within a combustion chamber and smoke is exhausted through a long chimney that is not exposed to flames and is not integral to the stove, but rather installed separately. In contrast, the small stoves either lack a chimney or the chimney is a few inches long and is regularly exposed to flames. The incorporation of a catalyst within large cookstoves is known in the prior art. However, a key requirement of large cookstoves in the prior art is that the catalyst not be exposed to flames. Similarly, while small catalytic camping stoves using gaseous fuels and PGM catalysts are known in the art, a small, solid-fuel-fired cookstove incorporating a catalyst exposed to flames is not known in the prior art.

Most known large cookstoves incorporating a catalyst typically use a PGM oxidation catalyst deposited on a ceramic substrate. PGMs are typically excellent oxidation catalysts and are the most common catalysts used to treat automobile exhaust. However, PGM catalysts add significant cost. In addition, large cookstove prior art teaches that the catalyst must be separated from any flames to ensure catalyst longevity, either by locating the catalyst deep in a long chimney or by locating the catalyst in a secondary combustion chamber free from flames and extreme temperatures. Here the "secondary combustion chamber" is the conduit for exhaust gases between the combustion chamber and the location where heat is extracted for the purpose of cooking. This prior art therefore actively teaches away from the present invention in which the catalyst is exposed to flames.

In the present invention, the oxidation catalyst is positioned directly above the fire in a chimneyless cookstove. Placing a catalyst in this position leads to certain challenges that must be overcome, such as the lack of natural draft caused by the lack of a chimney and potential catalyst damage caused by flame impingement. The prior art has not incorporated an oxidation catalyst in proximity to a cookstove's flame. We recognized that using typical, commercial, ceramic-supported, PGM catalysts would not be suitable for use in smaller stoves where the catalyst is subjected to direct flame impingement. Rather, an inexpensive oxidation catalyst supported on a refractory substrate is required for a small, chimneyless catalytic cookstove. Here "refractory" refers to material properties that include resistance to decomposition by heat, physical wear, and chemical attack. Additionally, the short nature of the stove requires that the catalyst not hinder the limited natural draft. Therefore, the catalyst must be supported on a substrate with a minimal pressure drop.

Oxidation catalysts lower the activation energy needed to oxidize a given reactant. In the case of complete combustion, a fuel is oxidized to form relatively harmless carbon dioxide and generate thermal energy. In a cookstove, this thermal energy is used to cook food. However, combustion is typically an incomplete reaction, leading to the formation of carbon monoxide, partially oxidized organics, and particulate matter, e.g. soot. Both carbon monoxide and particulate matter are harmful to humans when inhaled. An oxidation catalyst can promote the conversion of carbon monoxide and particulate matter to form carbon dioxide. Therefore introducing an oxidation catalyst to a cookstove will reduce the concentration of carbon monoxide and particulate matter and directly mitigate health problems associated with cooking over an open flame.

Rather than a PGM catalyst, a low-cost, chimney-free cookstove intended for developing communities requires a significantly less expensive oxidation catalyst. Potassium is a relatively inexpensive and readily abundant element that can also act as an oxidation catalyst, but potassium needs to be stabilized by other elements to remain active for long periods of time. There are several potassium compounds that are effective oxidation catalysts. We found potassium titanate to be particularly active and stable, but other low-cost compounds are also suitable for this purpose. These other low-cost compounds can include crystalline and amorphous metal oxides with a single metallic element, such as manganese oxide ($MnO$, $Mn_2O_3$, $Mn_3O_4$), or with multiple metallic elements such as potassium-silicon-calcium glass, potassium strontium titanate ($SrTiO_3$, $Sr_{0.8}K_{0.2}TiO_3$), potassium cobalt oxides ($K_{0.25}CoO_2$), potassium copper oxides ($KCuO$), potassium cobalt cerium oxides, and the like. Additionally, these low-cost compounds can be doped with metallic elements like copper, cobalt, cerium, and the like to further improve catalytic activity. An example of such a low-cost compound is potassium titanate, which has the chemical formula $K_2O \cdot nTiO_2$ (n=2, 4, 6, 8). More specifically, $K_2Ti_2O_5$ is effective and reduces particulate matter ignition temperature by 100° C. Potassium titanate has been described in the prior art as a catalyst used to oxidize soot produced by diesel engines and as a $NO_x$ storage and reduction (NSR) catalyst. However, $K_2Ti_2O_5$ has not been identified previously as a catalyst for reducing emissions from solid-fuel combustion.

Compared to particulate matter, carbon monoxide is more difficult to oxidize. The bond strength of the carbon-oxygen triple bond (1072 kJ/mol) found in carbon monoxide is significantly greater than the bond strength of carbon-carbon double bonds (602 kJ/mol) found in particulate matter. Surprisingly, we have shown that $K_2Ti_2O_5$ is also active for carbon monoxide oxidation. The carbon monoxide oxidation activity of $K_2Ti_2O_5$ is enhanced further when doped with either copper or cobalt. When doped with either of these transition metals, $K_2Ti_2O_5$ lowers the carbon monoxide oxidation temperature by 200° C. compared to the undoped $K_2Ti_2O_5$ catalyst.

Potassium titanate is typically produced as a powder, and therefore must be supported on a substrate to be integrated within a cookstove. The catalyst substrate must form a strong bond with potassium and be refractory. The substrate can be metal or ceramic. A metal substrate is generally preferred because ceramics are brittle and further embrittled by high temperatures, leading to poor durability. The metal can be a pure element or an alloy, but must have a high melting point. In one embodiment of the present invention, an iron-chromium-aluminum alloy is used for the substrate because the alloy is durable and demonstrates good adhesion with potassium titanate. However, other metallic and ceramic substrates would also be suitable for this purpose.

The substrate can take on many different shapes or designs. The primary requirement is that the pressure drop caused by the substrate is small enough to allow proper airflow through the cookstove. The pressure drop through the substrate is governed primarily by the substrate void fraction, thickness, and channel diameter. Here "void fraction" is defined as the ratio, expressed as a percentage, of voids to total volume. Here "thickness" is defined as the length of the substrate in the direction of exhaust flow. Here "channel diameter" is defined as the average hydraulic diameter of void spaces in between substrate structure. A substrate void fraction greater than 65%, a substrate thickness less than 1.5 inches, and a channel diameter in the range of 0.1 inches to 0.3 inches is suitable for purposes of the present invention. Monolithic catalyst substrates with a honeycomb pattern or a corrugated spiral pattern are near ideal. Here "honeycomb pattern" is defined as having parallel channels or holes, which are separated by many thin walls, where the channels can be square, hexagonal, round, or other shapes. Additional substrates can include beads of any shape, a mesh or system of meshes, wires and rods, raschig rings, or similar types of packing. In one embodiment of the present invention, a metal monolithic substrate with a corrugated spiral pattern has been found to be suitable. However, other substrate form factors having a high void fraction may also be suitable.

An additional element of the present invention is a passively controlled damper that self-regulates the air flow based on fuel size. Here "passive control" is defined as control that does not use any sensors or actuators and does not consume any power. Previously disclosed dampers are either manually controlled by the stove operator, or are automatically controlled by a temperature sensor and a powered actuator. Manually controlled dampers are used to switch between a fire starting position and a fire burning position. Manual dampers with a range of positions can also be used to optimize airflow for different fire temperatures or burn rates. However, these active dampers require regular manual adjustment by the stove operator or some type of automated switching mechanism. The prior art describes stoves with automatic damper controls incorporating thermoswitches and powered actuators to adjust the damper position based upon the fire temperature.

In one embodiment of the present invention, the passive damper comprises a flow obstruction attached to a hinge mechanism and suspended at the top of the fuel inlet duct. The passive damper can also take the form of a curtain or shroud-like barrier composed of flexible, vertically hanging, fire resistant strands. In operation, the fuel paced in the inlet duct impinges upon the flow obstruction, and causes the flow obstruction to swing open. The larger the size of the fuel, the more the flow obstruction is forced open. If no passive damper is present, using small pieces of fuel wood in the cookstove will result in an excess of air flowing through the stove due to the large open cross-sectional area for the buoyancy-driven combustion air draft. When a passive damper is used with small pieces of fuel, the passive damper swings down, partially blocking the flow, and preventing excess air from traveling through the stove. This allows the stove to operate more efficiently, as thermal energy can go towards heating food rather than heating excess air. Also, the damper promotes higher exhaust temperatures, and encourages light-off of the catalyst (i.e., achieving the minimum temperature required for catalytic surface oxidation reactions). When large amounts of fuel are used, the passive damper swings up, or otherwise moves out of the way, to allow large fuel wood to enter the cookstove. As the size of the fuel pieces is reduced through burning, the damper closes to meet the smaller fuel pieces and thus self-adjusts. Because the fuel blocks a portion of the inlet that corresponds to the size of the fuel pieces, airflow into the stove will remain at desired levels regardless of the size or amount of fuel wood used in the stove.

An object of this invention is to incorporate a non-PGM catalyst within a cookstove to reduce the emission of carbon monoxide and particulate matter.

A further object of this invention is to incorporate a passive damper that adjusts airflow through a cookstove based on the size of solid fuel used.

Yet another object of this invention is to integrate with buoyancy driven or forced-convection solid-fuel cookstoves, whether biomass or fossil-fuel fired.

Yet another object of this invention is that the catalyst is a potassium titanate that can be further doped with either copper or cobalt.

Yet another object of this invention is that the catalyst is adhered to a solid, porous, refractory support structure, or substrate, suspended above the cookstove fire.

Yet another object of this invention is that the passive damper controls airflow by physically blocking a portion of the fuel inlet cross section.

Yet another object of this invention is that the passive damper can rotate or otherwise move to clear the inlet and allow the entry of larger pieces of fuel.

The present invention improves on the known variations of solid-fuel cookstoves by incorporating a non-PGM catalyst and a passive damper to improve combustion efficiency and reduce emission of carbon monoxide and particulate matter.

Other objects, advantages and novel features of the present invention will become apparent from the following detailed description when considered in conjunction with the accompanying drawings and non-limiting examples herein.

DETAILED DESCRIPTION OF THE DRAWINGS

Figure 1:
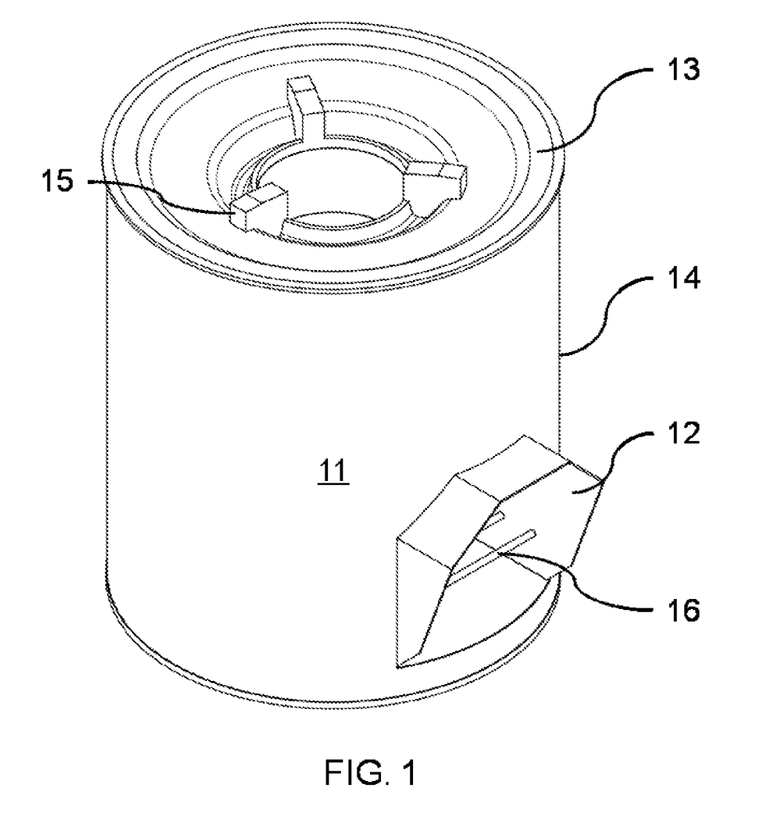
FIG. 1 is an isometric view of a small solid-fuel cookstove in accordance with one embodiment of the present invention.

Now referring to FIG. 1, an embodiment of a catalytic cookstove 11 in accordance with the present invention is shown with a fuel feed inlet 12 capable of accommodating both small and large pieces of solid fuel. At the top of the catalytic cookstove 11, a pot support 13 may be affixed to the top of the stove body 14. Pot support 13 may be removably affixed to stove body 14. The method by which the pot support 13 is affixed to a stove body 14 can take many forms, including but not limited to, using rivets, screws, bolts, high-temperature adhesives, or metal joining. Pot support 13 may also simply sit atop stove body 14 and not be affixed thereto. The pot support 13 includes one or more protruding structures 15, upon which a cooking vessel rests. The protruding structures 15 extend above the rest of the pot support 13 to allow hot gases to exit the cookstove 11 and transfer heat to a cooking vessel. The pot support 13 can accommodate a wide range of cooking vessels, including, but not limited to pots, pans, skillets, comals, woks, Dutch ovens, and tea pots. The pot support 13 can also support a grill grate for grilling meats and vegetables.

During use fuel is fed through the fuel feed inlet 12 and may rest on a fuel rack 16. A fire is ignited within the cookstove 11 and the fire is fed by the operator pushing additional fuel through the fuel feed inlet 12. If the cookstove is equipped with a fuel rack, as fuel is fed to the fire, it sits on the fuel rack 16, rather than the base of the cookstove 11. The fuel can be any solid fuel such as wood, charcoal, pellets, dung, agricultural residues and the like. In addition to fuel, the fire also requires oxygen to remain lit. Oxygen is supplied by air that flows into the cookstove 11 through the fuel feed inlet 12. Air flow is driven by the cookstove's 11 draft, which is a pressure differential that induces air flow and is caused by the elevated fire temperature. When used, the fuel rack 16 allows for air to flow under and through the solid fuel rather than around or above the solid fuel. The fuel rack 16 can be affixed to the catalytic cookstove 11 or it can be a separate and distinct component. The fuel rack 16 can take many forms, including but not limited to a wire rack, a solid plate, a perforated plate, or a set of rungs. The fuel rack 16 also allows ash and small coals to fall to the bottom of the cookstove 11. This prevents the fire from being choked as ash accumulates. In one embodiment of the present invention, the ash falls into a removable ash pan to allow for easy ash disposal. As air flows through the cookstove 11, the air heats up to form a hot flue gas that travels vertically from the combustion chamber up and out of the catalytic cookstove 11 via buoyancy driven flow. Heat transfer from the hot flue gases produced by such a fire is the primary mechanism by which a cooking vessel (not shown) is heated.

Figure 2:
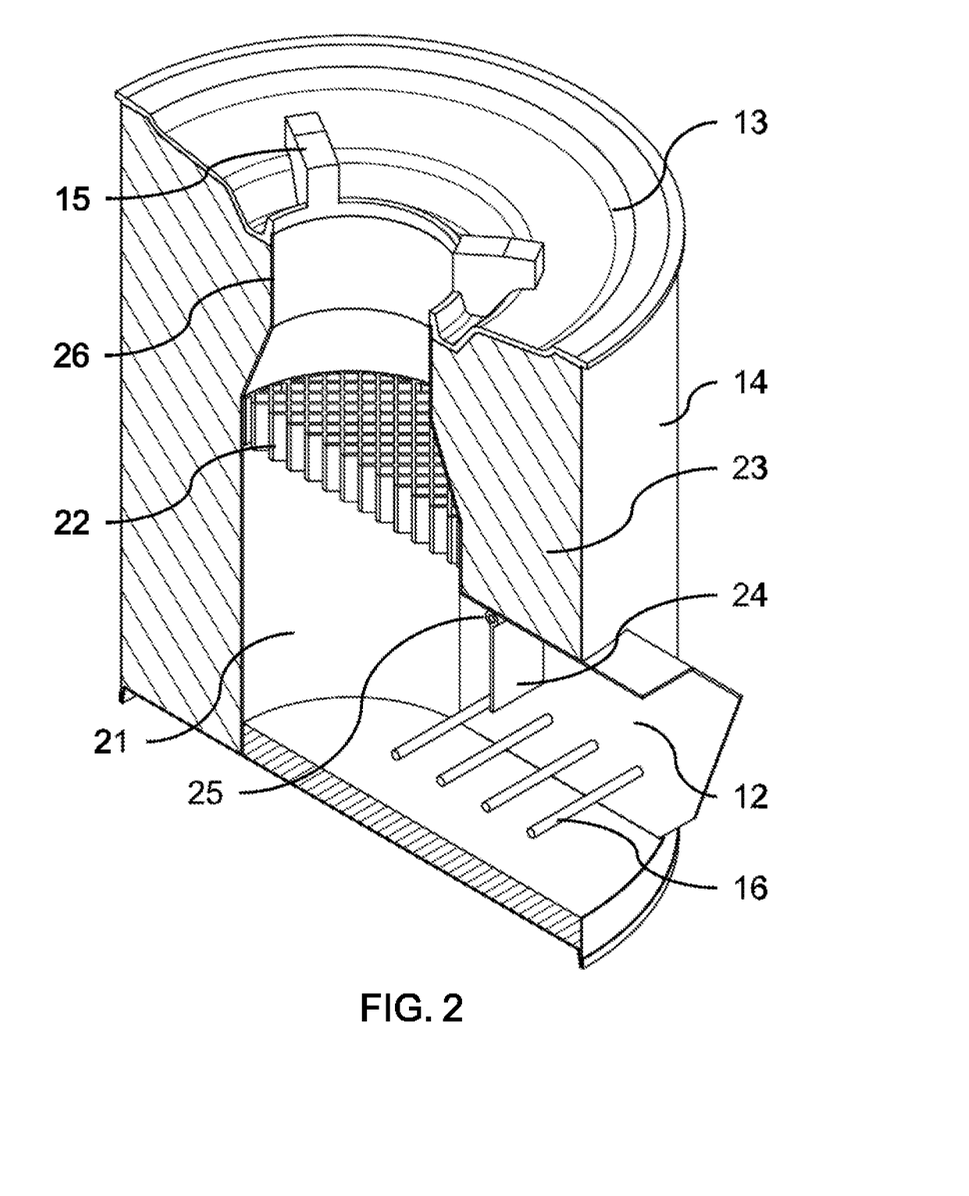
FIG. 2 is a cross-sectional isometric view of the internal components of the small solid-fuel cookstove in accordance with the same embodiment of the present invention.

FIG. 2 shows a cross sectional isometric view of the internal components of the catalytic cookstove 11. The stove combustion chamber 21 occupies the center of the catalytic cookstove 11 and extends vertically. Air enters the stove through the fuel feed inlet 12 where it passes under and around the fuel rack 16 (when so equipped). The air is then heated by a fire located at the central base of the cookstove 11 and passes vertically up through the stove combustion chamber 21 and through a catalyst coated substrate 22 which is comprised of a substrate that provides an overarching structure and a catalytic compound that is coated on the surface of the substrate. Extending beyond the catalyst coated substrate 22, is the exhaust conduit 26 which directs combustion gases and unreacted air out of the stove. The volumetric flow rate and velocity of air through the stove is driven by a draft caused by the temperature difference between the fire and the ambient. Obstructions and constrictions increase the pressure drop through the cookstove 11 and can hinder overall airflow by reducing the stove draft. Based on these constraints, it is important that the catalyst coated substrate 22 have a geometry sufficient to allow a proper stove draft. The substrate of the catalyst coated substrate 22 is coated with an oxidation catalyst and is suspended within the stove combustion chamber 21 and above the fire. In one embodiment of the present invention, the stove combustion chamber narrows above the catalyst coated substrate 22 to ensure air velocity through the stove combustion chamber 21 remains constant.

During operation, a fire is located at the central base of the cookstove 11 and the fire is fed by combustion of a solid fuel. Complete combustion of the fuel would produce only carbon dioxide, water, and heat. However, because combustion requires oxygen to be readily accessible and well mixed with the fuel, combustion is rarely complete. This results in additional, partially oxidized products that are harmful to human health, and include carbon monoxide, particulate matter, and partially oxidized organics. Upon leaving the fire, partially oxidized products quickly cool to a temperature where unassisted oxidation to carbon dioxide is no longer possible. As the partially oxidized products travel up through the stove combustion chamber 21, they come into contact with the catalyst coated substrate 22, which is coated with an oxidation catalyst. In one embodiment of the present invention, the oxidation catalyst is potassium-based. The catalyst effectively reduces the temperature at which oxidation occurs. Therefore, the catalyst facilitates the oxidation of carbon monoxide, particulate matter, and partially oxidized organics to carbon dioxide.

Insulation 23 is optionally located between the stove combustion chamber 21 and the stove body 14. Insulation 23 can be any refractory material with insulating properties and is used to improve thermal efficiency. A passive damper 24 is attached to a hinge-like mechanism 25 and suspended at the top of the fuel feed inlet 12. The passive damper 24 is able to rotate around an axis defined by the hinge-like mechanism 25 when impinged by solid fuel. The rotational nature of the passive damper 24 allows the catalytic cookstove 11 to accommodate a range of solid fuel sizes. In alternative embodiments, the damper may comprise a flexible curtain or shroud-like barrier composed of flexible, vertically hanging, fire resistant strands.

Figure 3A:
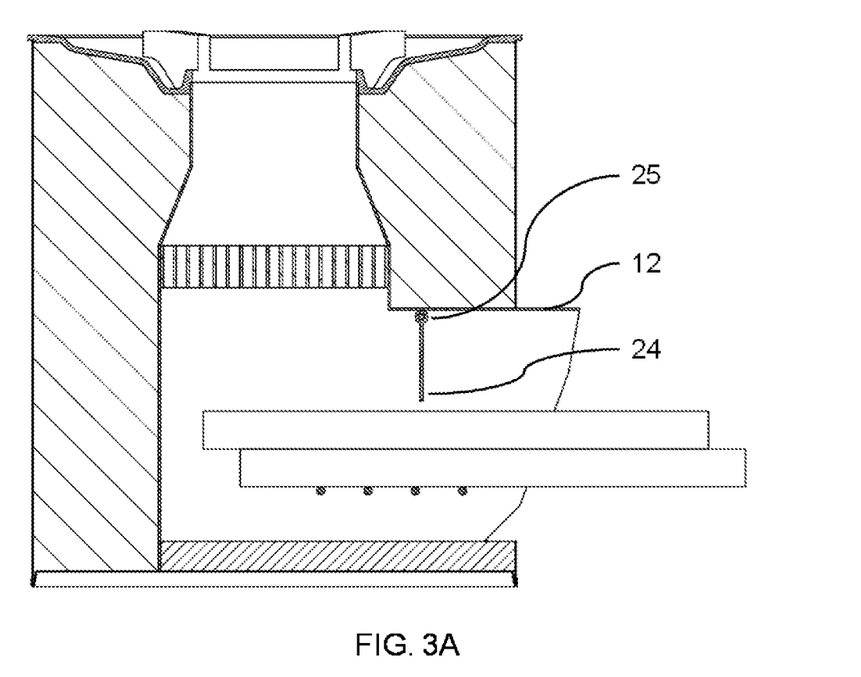
FIGS. 3A and 3B are cross-sectional side views of the small solid-fuel cookstove in accordance with the same embodiment of the present invention being fed a small amount of solid fuel (FIG. 3A) a large amount of solid fuel (FIG. 3B).
Figure 3B:
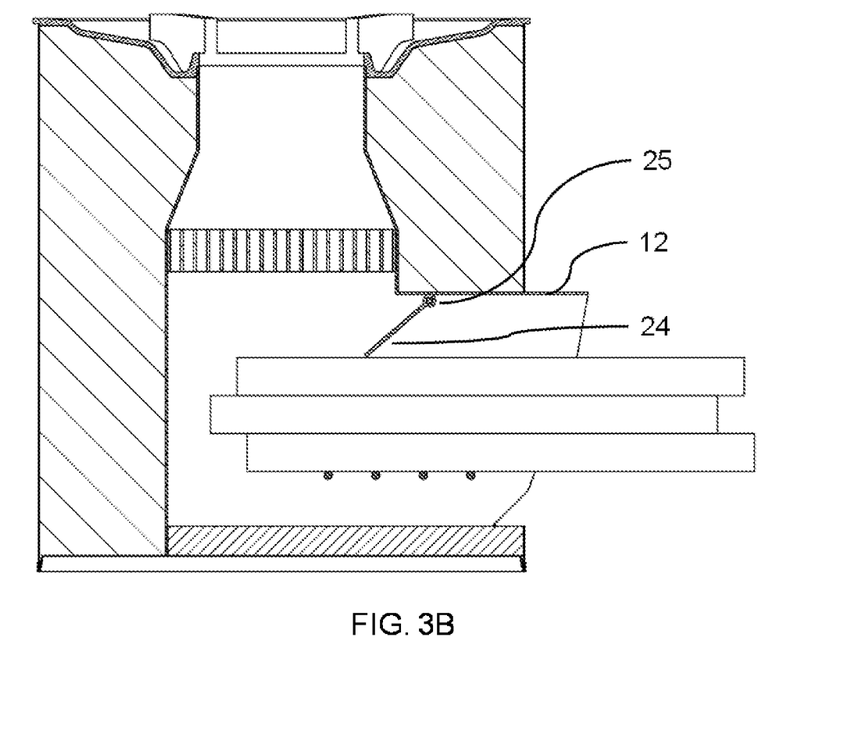

FIGS. 3A and 3B show the catalytic cookstove 11 accommodating different sizes or quantities of fuel. FIG. 3A shows the catalytic cookstove 11 being fed with a small amount of solid fuel. In this scenario, the passive damper 24 remains in a vertical resting position. The passive damper 24 then acts to obstruct the free flow of air into the stove and prevent the air-to-fuel ratio from becoming excessively fuel lean. By maintaining the air-to-fuel ratio within an acceptable range, the passive damper 24 ensures the catalytic cookstove 11 operates efficiently.

FIG. 3B shows a second scenario where the catalytic cookstove 11 is fed with a large amount of solid fuel. In this scenario, the passive damper 24 rotates around the hinge-like mechanism 25 and towards the back of the catalytic cookstove 11 to accommodate the passage of the larger fuel through the fuel feed inlet 12. The cross-section that was occupied by the passive damper 24 is now partially occupied by the fuel, and therefore the air-to-fuel ratio remains within the acceptable range and the catalytic cookstove 11 is able to operate efficiently. As the fuel burns down and its size is reduced, the passive damper 24 swings down to meet the reduced size fuel and thus self-adjusts the air to fuel ratio.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

EXAMPLES

The following examples are intended to be illustrative of the present invention and to teach one of ordinary skill how to make and use the invention. These examples are not intended to limit the invention or its protection in any way.

Example 1

Particulate Matter Emissions from a Catalytic Cookstove

The present invention was tested in a laboratory setting to demonstrate a reduction in particulate matter and carbon monoxide emissions. Tests were conducted using an abbreviated version of the Water Boil Test (WBT) Version 4.2.2 developed by the International Organization for Standardization (ISO) as an International Workshop Agreement (IWA). The WBT consists of three different stages (cold start, hot start, and simmer phase) that approximate different cooking phases. Each WBT involved measuring stove emissions, heat addition to the water, and fuel consumption. Starting with a cold stove and 5 liters of water in an aluminum pot, a fire was lit and maintained to bring the water to its boiling temperature Immediately following the cold start, the fire was extinguished, fresh water was placed in the pot, and a new fire was kindled. The new pot of water was once again brought to a boil, ending the hot-start phase of the WBT. When the hot start was finished, the pot of water was held within 6° C. of the boiling temperature for a total of 45 minutes; this stage of the WBT was considered the simmer phase. During the WBT a dedicated hood exhaust system was used to collect stove emissions for measurement. Concentrations of particle mass, particle number, carbon monoxide, carbon dioxide, total hydrocarbons, and nitrogen oxides were measured throughout the WBT.

Four stove configurations were tested using the WBT: 1) a baseline stove, 2) a stove with a non-catalytic 0.5-inch monolith, 3) a stove with a catalytic 0.5-inch monolith, and 4) a stove with restricted airflow and a catalytic 0.5-inch monolith. The catalyst used here was potassium titanate (specifically, $K_2Ti_2O_5$). Compared to the baseline stove, a stove incorporating a non-catalytic monolith increased particulate matter emissions by 16%. Coating the same monolith with catalyst reduced particulate matter emissions by 12% compared to the baseline stove. Furthermore, restricting air flow into the stove in conjunction with a catalytic monolith reduced particulate matter emissions by 36% compared to the baseline stove. These results demonstrated the effectiveness of incorporating a potassium-based catalyst within a cookstove.

Example 2

Carbon Monoxide Oxidation

The carbon monoxide oxidation activity of $K_2Ti_2O_5$ was determined using a small packed bed reactor. A known amount of carbon monoxide in air (100 ppm, by volume) was flown through a small tubular reactor without catalyst as a baseline and packed with catalyst. Without a catalyst, carbon monoxide remained unreacted up to 700° C. Packing the reactor with $K_2Ti_2O_5$ caused carbon monoxide to be oxidized as low as 500° C. (4% conversion) with conversion reaching 45% at 700° C. Doping $K_2Ti_2O_5$ with copper or cobalt significantly lowered the temperature for which carbon monoxide oxidation began and improved carbon monoxide conversion. After doping with either copper or cobalt, carbon monoxide oxidation was observed as low as 300° C. (10-20% conversion), and by 700° C. carbon monoxide conversion was approximately 90% for each metal doped catalyst. Based on these results, doping $K_2Ti_2O_5$ with copper or cobalt can reduce carbon monoxide stove emissions and increase carbon monoxide conversion upward of 55% to 90%.

We claim:
1. A solid-fuel burning stove comprising:
    a stove body defining a combustion chamber, wherein the combustion chamber has a top portion;
    the stove body further having an inlet adapted to receive solid fuel, the inlet being disposed substantially at a base of the combustion chamber and the inlet defining a passage for the intake of air and fuel into the combustion chamber; and
    a catalyst coated substrate extending across the top portion of the combustion chamber and in proximity to any direct flame impingement coming from the combustion chamber and comprising a substrate and a catalyst compound coating the substrate;
    wherein the substrate comprises an iron-chromium-aluminum alloy,
    wherein the catalyst compound comprises $K_2Ti_2O_5$, and
    wherein the catalyst coated substrate is configured to permit the flow of exhaust gases therethrough and to expose the catalytic compound to the exhaust gases.

2. The solid fuel burning stove of claim 1 further comprising a passive damper disposed within the inlet, the damper adapted to at least partially block the flow of air into the chimney;
   wherein the damper is adapted to transition from a first position to a second position upon impingement thereon by solid fuel received into the inlet.

3. The solid fuel burning stove of claim 2 wherein:
the passive damper is comprised of a plate suspended from a hinge, the hinge being disposed along the top of the inlet;
the hinge and plate are adapted to enable the plate to swing from a substantially vertical position to an angled position; and
the plate blocks a greater proportion of the inlet passage in the vertical position than in the angled position.

4. The solid fuel burning stove of claim 3 wherein the plate is perforated.

5. The solid fuel burning stove of claim 2 wherein the passive damper comprises a substantially flexible curtain suspended from the top of the inlet, the curtain being adapted to swing from the top of the inlet.

6. The solid fuel burning stove of claim 2 wherein the passive damper comprises one or more substantially flexible fire-resistant strands, the one or more strands being adapted to swing from the top of the inlet.

7. The solid fuel burning stove of claim 1 further comprising a support disposed on the stove body above the exhaust conduit, the support adapted to receive a cooking vessel.

8. The solid fuel burning stove of claim 1 further comprising a rack disposed within the inlet, the rack adapted to support solid fuel above the floor of the inlet and to permit the flow of air below the solid fuel.

9. The solid fuel burning stove of claim 1 wherein the catalytic compound is doped with cobalt or copper.

10. The solid fuel burning stove of claim 1 wherein the catalyst coated substrate is shaped as a honeycomb monolith, a spiral monolith, a mesh, a series of meshes, a plurality of beads of any shape, raschig rings, or a combination thereof.

11. The solid fuel burning stove of claim 10 wherein the catalyst coated substrate has a void fraction greater than 65%.

12. The solid fuel burning stove of claim 10 wherein the catalyst coated substrate has a thickness of less than 1.5 inches.

13. The solid fuel burning stove of claim 10 wherein the catalyst coated substrate has an average channel diameter in the range of 0.1 inches to 0.3 inches.

* * * * *

UNITED STATES PATENT AND TRADEMARK OFFICE
CERTIFICATE OF CORRECTION

PATENT NO. : 10,646,824 B2
APPLICATION NO. : 16/005897
DATED : May 12, 2020
INVENTOR(S) : Paul E. Yelvington et al.

Page 1 of 1

It is certified that error appears in the above-identified patent and that said Letters Patent is hereby corrected as shown below:

On the Title Page

Name of (73) Assignee: "Mainsteam Engineering Corporation" should be deleted and replaced with --Mainstream Engineering Corporation--.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*